United States Patent
Kollin et al.

(10) Patent No.: US 9,507,066 B2
(45) Date of Patent: Nov. 29, 2016

(54) EYEPIECE FOR NEAR EYE DISPLAY SYSTEM

(71) Applicant: MICROSOFT TECHNOLOGY LICENSING, LLC, Redmond, WA (US)

(72) Inventors: Joel S. Kollin, Seattle, WA (US); Jaron Lanier, Sausalito, CA (US); Douglas C. Burger, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/320,382

(22) Filed: Jun. 30, 2014

(65) Prior Publication Data

US 2015/0378074 A1    Dec. 31, 2015

(51) Int. Cl.
*G02F 1/1335* (2006.01)
*G02B 5/30* (2006.01)
*G02B 27/01* (2006.01)

(52) U.S. Cl.
CPC ........... *G02B 5/3016* (2013.01); *G02B 5/3058* (2013.01); *G02B 27/0172* (2013.01)

(58) Field of Classification Search
CPC .................................................... G02B 5/3016
See application file for complete search history.

(56) References Cited

U.S. PATENT DOCUMENTS

| | | | |
|---|---|---|---|
| 5,686,940 A | 11/1997 | Kuga | |
| 5,903,396 A | 5/1999 | Rallison | |
| 5,973,833 A | 10/1999 | Booth et al. | |
| 6,072,443 A | 6/2000 | Nasserbakht et al. | |
| 6,088,541 A | 7/2000 | Meyer | |
| 6,144,439 A | 11/2000 | Carollo | |
| 6,563,638 B2 | 5/2003 | King et al. | |

(Continued)

FOREIGN PATENT DOCUMENTS

| EP | 0351967 A2 | 1/1990 |
|---|---|---|
| EP | 0566004 A2 | 10/1993 |

(Continued)

OTHER PUBLICATIONS

Kessler, "Optics of Near to Eye Displays", Oasis: International Meeting on Optical Engineering and Science, Feb. 19, 2013, 37 pages.

(Continued)

*Primary Examiner* — Timothy L Rude
(74) *Attorney, Agent, or Firm* — Micah Goldsmith; Judy Yee; Micky Minhas

(57) ABSTRACT

An optical display system configured to transmit light along a light path to a user's eye, the display system comprising a circular polarizing reflector configured to reflect light with a first polarization from an image source, a quarter wave plate downstream of the circular polarizing reflector in the light path and configured to rotate the polarization of the light to a second polarization, and a curved linear polarizing reflector downstream of the quarter wave plate and configured to reflect the light back through the quarter wave plate along the light path in the direction of the circular polarizing reflector. The quarter wave plate further configured to rotate the polarization of the light received from the curved linear polarizing reflector to a third polarization and the circular polarizing reflector further configured to receive said light from the quarter wave plate and transmit the light toward the user's eye.

20 Claims, 7 Drawing Sheets

(56) References Cited

U.S. PATENT DOCUMENTS

| | | | |
|---|---|---|---|
| 6,567,101 B1 | 5/2003 | Thomas | |
| 6,847,488 B2 | 1/2005 | Travis | |
| 7,595,933 B2 | 9/2009 | Tang | |
| 7,675,684 B1 | 3/2010 | Weissman et al. | |
| 7,869,109 B2 | 1/2011 | Shin | |
| 7,918,559 B2 | 4/2011 | Tesar | |
| 8,075,140 B2 | 12/2011 | Phillips, III et al. | |
| 8,125,448 B2 | 2/2012 | Ranta et al. | |
| 8,144,547 B2 | 3/2012 | Plancon et al. | |
| 8,203,577 B2 | 6/2012 | Hoover | |
| 8,432,322 B2 | 4/2013 | Amm et al. | |
| 8,488,246 B2 | 7/2013 | Border et al. | |
| 8,570,656 B1 | 10/2013 | Weissman | |
| 8,582,206 B2 | 11/2013 | Travis | |
| 8,649,098 B2* | 2/2014 | Ruhle | G02B 5/3016 349/11 |
| 8,672,486 B2 | 3/2014 | Travis | |
| 9,019,175 B2* | 4/2015 | Lu | G02B 27/0172 345/8 |
| 2002/0085287 A1 | 7/2002 | Egawa | |
| 2002/0113912 A1 | 8/2002 | Wright et al. | |
| 2003/0093600 A1 | 5/2003 | Perala et al. | |
| 2003/0096648 A1 | 5/2003 | Ohno et al. | |
| 2004/0164927 A1 | 8/2004 | Suyama et al. | |
| 2005/0052628 A1 | 3/2005 | Ikeda et al. | |
| 2007/0064310 A1 | 3/2007 | Mukawa et al. | |
| 2008/0266530 A1 | 10/2008 | Takahashi et al. | |
| 2009/0189974 A1 | 7/2009 | Deering | |
| 2009/0310858 A1 | 12/2009 | Jupe | |
| 2010/0053069 A1 | 3/2010 | Tricoukes et al. | |
| 2010/0053771 A1 | 3/2010 | Travis et al. | |
| 2010/0117988 A1 | 5/2010 | Jacobs et al. | |
| 2010/0177388 A1 | 7/2010 | Cohen et al. | |
| 2011/0007035 A1 | 1/2011 | Shai | |
| 2011/0148931 A1 | 6/2011 | Kim | |
| 2011/0181801 A1* | 7/2011 | Okumura | G03B 21/28 349/5 |
| 2011/0221658 A1 | 9/2011 | Haddick et al. | |
| 2011/0228195 A1* | 9/2011 | Shikii | G02B 6/0031 349/62 |
| 2011/0310233 A1 | 12/2011 | Bathiche et al. | |
| 2012/0069413 A1 | 3/2012 | Schultz | |
| 2013/0021226 A1 | 1/2013 | Bell | |
| 2013/0033485 A1 | 2/2013 | Kollin et al. | |
| 2013/0113973 A1 | 5/2013 | Miao | |
| 2013/0201094 A1 | 8/2013 | Travis et al. | |
| 2015/0301336 A1* | 10/2015 | Denefle | G02B 27/0172 345/8 |
| 2015/0370074 A1* | 12/2015 | McDowall | G02B 27/0172 349/11 |
| 2015/0378074 A1* | 12/2015 | Kollin | G02B 5/3016 349/185 |

FOREIGN PATENT DOCUMENTS

| | | |
|---|---|---|
| EP | 1267197 A2 | 12/2002 |
| GB | 2360603 A | 9/2001 |
| GB | 2449682 A | 12/2008 |
| JP | 2006202067 A | 8/2006 |
| WO | 2008117141 A1 | 10/2008 |
| WO | 2013096428 A1 | 6/2013 |
| WO | 2014031326 A1 | 2/2014 |

OTHER PUBLICATIONS

ISA European Patent Office, International Search Report and Written Opinion Issued in Application No. PCT/US2015/037565, Sep. 16, 2015, WIPO, 12 pages.

Rolland, J., "Wide-angle, off-axis, see-through head-mounted display", Optical Engineering, vol. 39, No. 7, Jul. 2000, 8 pages.

York, J. et al., "Human-computer interaction issues for mobile computing in a variable work context", International Journal of Human-Computer Studies, HCI Issues in Mobile Computing, vol. 60, Issues 5-6, May 2004, Available online Feb. 20, 2004, 27 pages.

Travis, A. et al., "Flat Projection for 3-D", In Proceedings of the IEEE, vol. 94, Issue 3, Mar. 2006, 11 pages.

Pfeiffer, T., "Towards Gaze Interaction in Immersive Virtual Reality: Evaluation of a Monocular Eye Tracking Set-Up", Virtuelle and Erweiterte Realitat—Funfter Workshop der GI-Fachgruppe VR/AR, Sep. 1, 2008, Available as early as Dec. 2007, 12 pages.

Talha, M. et al., "Design of a Compact Wide Field of View HMD Optical System using Freeform Surfaces", In Proceedings of SPIE vol. 6624, International Symposium on Photoelectronic Detection and Imaging 2007: Optoelectronic System Design, Manufacturing, and Testing, Mar. 12, 2008, 14 pages.

Sherstyuk, A. et al., "Virtual Roommates in Ambient Telepresence Applications", In Proceedings of the 2008 International Conference on Artificial Reality and Telexistence (ICAT'08), Dec. 1, 2008, Japan, 4 pages.

Kratz, S., "HoverFlow: Expanding the Design Space of Around-Device Interaction", In Proceedings of the 11th International Conference on Human-Computer Interaction with Mobile Devices and Services (MobileHCI09), Sep. 15, 2009, Available as early as Dec. 2008, Bonn, Germany, 8 pages.

Siriborvornratanakul, T. et al., "A Portable Projector Extended for Object-Centered Real-Time Interactions", 2009 Conference for Visual Media Production (CVMP '09), Nov. 12, 2009, London, 9 pages.

Strickland, J., "Head-mounted Displays—How Virtual Reality Gear Works", How Stuff Works website, Retrieved at http://electronics.howstuffworks.com/gadgets/other-gadgets/VR-gear1.htm, Available as early as Feb. 1, 2009, Retrieved on Mar. 30, 2011, 3 pages.

"Microsoft Develops Glasses-Free Eye-Tracking 3D Display", Tech-FAQ, Retrieved at http://www.tech-faq.com/microsoft-develops-glasses-free-eye-tracking-3d-display.html, Retrieved on and available as early as Nov. 2, 2011, 3 pages.

"For any kind of proceeding 2011 springtime as well as coil nailers as well as hotter summer season", Lady Shoe Worlds, Retrieved at http://www.ladyshoesworld.com/2011/09/18/for-any-kind-of-proceeding-2011-springtime-as-well-as-coil-nailers-as-well-as-hotter-summer-season/, Sep. 18, 2011, Retrieved on and available as early as Nov. 3, 2011, 2 pages.

Mogg, T., "High-tech Airwave ski goggles from Oakley bring augmented reality to the slopes", Digital Trends, Retrieved at http://www.digitaltrends.com/cool-tech/high-tech-airwave-ski-goggles-from-oakley-bring-augmented-reality-to-the-slopes/, Nov. 1, 2012, 3 pages.

"See-Through Enabled Efficient Adaptively-Focused Lightweight Low-Cost Head-Worn Display—Navy SBIR FY2012.1", Retrieved at http://www.navysbir.com/12_1/211.htm, Retrieved on and available as early as Nov. 21, 2012, 1 page.

Raveendran, K. et al., "Instant Radiosity for Augmented Reality", Ending Credits, Available at http://www.endingcredits.com/projects/ARInstantRadiosity/index.html, Retrieved on and available as early as Nov. 21, 2012, 14 pages.

ISA Korean Intellectual Property Office, International Search Report and Written Opinion issued in Application No. PCT/US2012/047090, Jan. 23, 2013, WIPO, 10 pages.

IPEA European Patent Office, Second Written Opinion issued in Application No. PCT/US2015/037565, May 18, 2016, WIPO, 7 pages.

IPEA European Patent Office, International Preliminary Report on Patentability issued in Application No. PCT/US2015/037565, Sep. 8, 2016, WIPO, 13 pages.

* cited by examiner

EYEPIECE FOR NEAR EYE DISPLAY SYSTEM

BACKGROUND

Mixed reality devices allow users to view the real world while simultaneously viewing computer generated graphics overlaying real world objects and scenery in the user's field of vision. These graphics may be used by the device to enhance the user's viewing experience in many ways, such as by displaying information about objects or locations viewed by the user.

Common designs for mixed reality devices utilize reflective beamsplitters and mirrors to direct both ambient light from the real world and light from an electronic display device toward a user's eye. In a typical design, ambient light enters the device through one beamsplitter while light from an electronic display enters through a second beamsplitter. Light from each source travels along separate light paths before being overlaid and directed out of the system toward the user's eye. In order to properly direct the light, however, the light paths within the system often require the light to pass through or reflect from the first or second beamsplitter one or more times.

Reflective beamsplitters are typically designed to transmit or reflect only a portion of incident light. Thus, mixed reality devices are severely limited by the amount of light intensity lost each time the light in the system reflects from or is transmitted through one of the beamsplitters. As a result, the brightness of the light in the system is diminished and the contrast between the ambient light entering the system and the light generated from the electronic display device cannot be properly controlled. Such an effect reduces the sharpness of graphics displayed on the device and negatively impacts the user's viewing experience. In addition, the loss of light from the electronic display requires the device to expend more power to produce visible graphics and thus reduces the overall battery life of the device.

SUMMARY

An optical display system configured to transmit light along a light path to a user's eye is provided. The display system may comprise a circular polarizing reflector configured to reflect light with a first polarization from an image source, a quarter wave plate downstream of the circular polarizing reflector in the light path and configured to rotate the polarization of the light to a second polarization, and a curved linear polarizing reflector downstream of the quarter wave plate and configured to reflect the light back through the quarter wave plate along the light path in the direction of the circular polarizing reflector. The quarter wave plate may be further configured to rotate the polarization of the light received from the curved linear polarizing reflector to a third polarization and the circular polarizing reflector may be further configured to receive said light from the quarter wave plate and transmit the light toward the user's eye.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, current designs for mixed reality display devices suffer from limitations due to the inefficiency of reflecting light multiples times from traditional beamsplitters. To address these issues, embodiments are disclosed herein that relate to an optical display device which may combine the advantages of highly efficient circular and linear polarizing reflectors with the use of a switchable wave plate to produce a mixed reality device with improved efficiency.

Figure 1A:
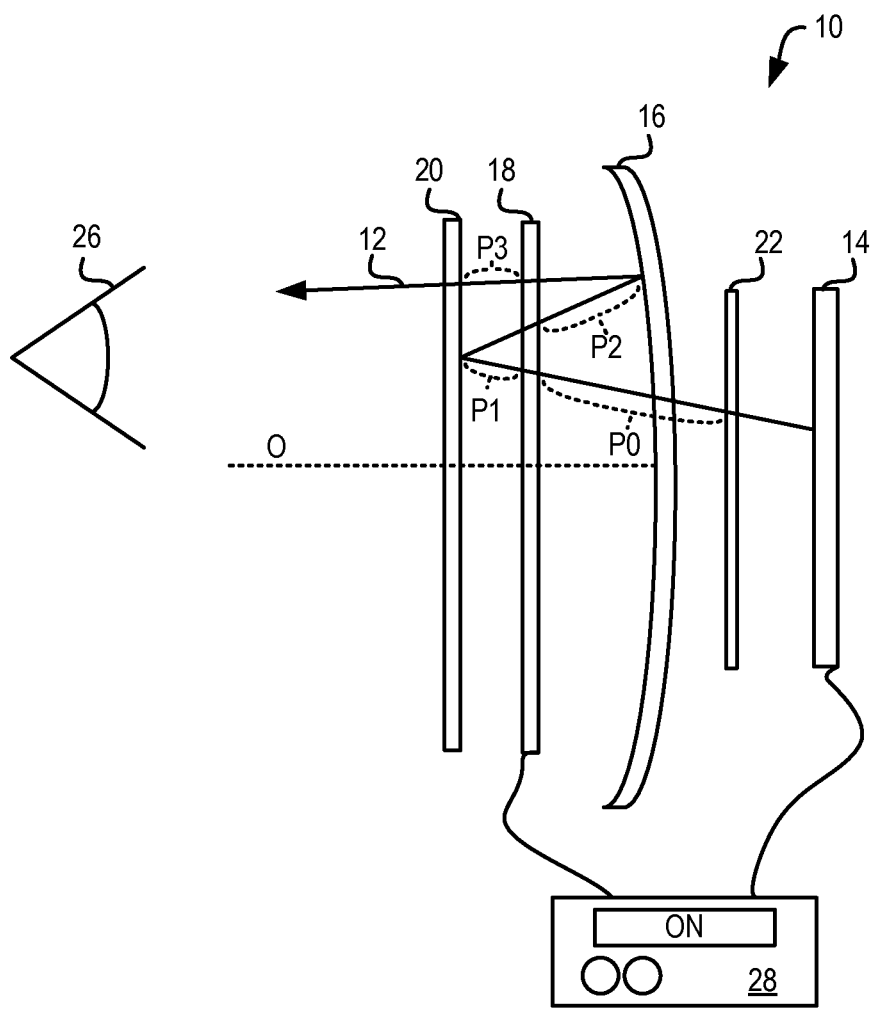
FIG. 1A shows an optical display system to direct light from an image source to a user's eye in accordance with an embodiment of this disclosure.

FIG. 1A depicts an optical display system 10 that may be configured to transmit light along a light path 12 to a user's eye 26. The display system 10 may comprise a circular polarizing reflector 20 configured to reflect light with a first polarization P1 originating from an image source 14 as well as a quarter wave plate 18 positioned downstream of the circular polarizing reflector 20 in the light path 12. The quarter wave plate 18 may be configured to rotate the polarization of the light from the first polarization P1 to a second polarization P2. A curved linear polarizing reflector 16 may be positioned downstream of the quarter wave plate 18 and may be configured to reflect the light with the second polarization P2 back through the quarter wave plate 18 along the light path 12 in the direction of the circular polarizing reflector 20. The quarter wave plate 18 may be further configured to rotate the polarization of the light received from the curved linear polarizing reflector 16 from the second polarization P2 to a third polarization P3. The circular polarizing reflector may be further configured to receive the light having the third polarization P3 from the quarter wave plate 18 and to transmit the light with the third polarization P3 toward the user's eye 26.

The circular polarizing reflector 20 in optical display system 10 may be configured to transmit one of either right-hand polarized or left-hand polarized light and to reflect the other. Likewise, the curved linear polarizing reflector 16 may be configured to transmit one of S-polarized or P-polarized light and reflect the other. The quarter wave plate 18 may be configured to rotate the polarization of the light in a four-phase pattern alternating between linear and circular polarization. For example, the quarter wave plate 18 may be configured to rotate S-polarized light to right-hand circular polarized light after a first pass, rotate the right-hand circular polarized light to linear P-polarized light after a second pass, and rotate the P-polarized light back to left-hand circular polarized light after a third pass.

In FIG. 1A, light of polarization P1 may reflect from circular polarizing reflector 20. In certain embodiments, polarization P1 may be one of right-hand circular polarization or left-hand circular polarization. The light of polarization P1 traveling along light path 12 may next pass through quarter wave plate 18 and obtain the polarization P2. In certain embodiments, P2 may be one of linear S-polarization or P-polarization. The system 10 may next be configured such that light of polarization P2 next reflects off of the linear polarizing reflector 16 and passes through the quarter wave plate 18 a second time, obtaining a polarization P3. In certain embodiments, the third polarization P3 will be the opposite circular polarization of the polarization P1. The system 10 may then be configured such that light of polarization P3 passes through the circular polarizing reflector 20 along the light path 12 toward the user's eye 26.

The display system 10 may be further configured such that the quarter wave plate 18 is a switchable quarter wave plate configured to rotate the polarization of the light if the quarter wave plate 18 is activated and to not rotate the polarization of the light if the quarter wave plate 18 is deactivated. In FIG. 1A, the quarter wave plate 18 is depicted as a switchable wave plate to control the transmission of light through the system 10 to the user's eye 26. The switchable quarter wave plate may be activated or deactivated by applying an electric current and may be constructed from materials such as Pi-cell or polymer-stabilized liquid crystal devices. FIG. 1A depicts the quarter wave plate 18 as controlled via time-multiplexer 28. In the depicted embodiment, time-multiplexer 28 is set to an "ON" state, which activates the quarter wave plate 18 and allows light to pass through the system as described above. In other embodiments, it should be appreciated that other devices may be used to control the quarter wave plate 18.

Figure 1B:
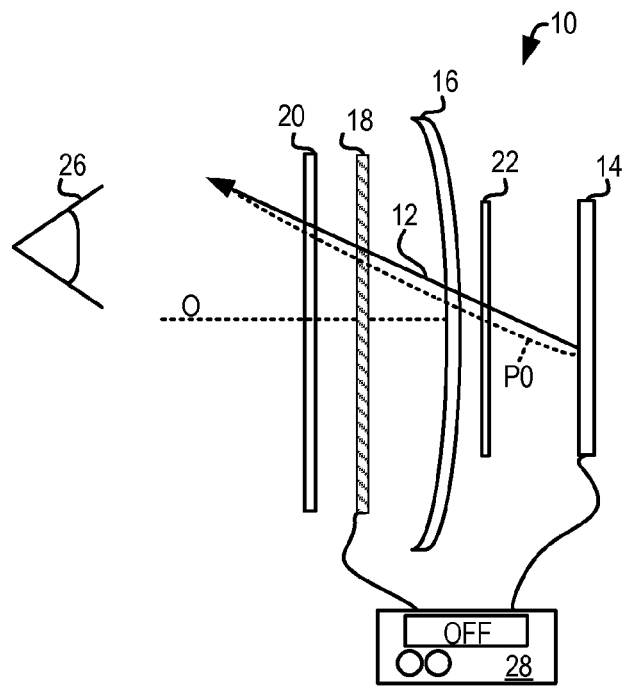
FIG. 1B shows the system of FIG. 1A further configured to prevent an unmagnified image from reaching a user's eye by deactivating a quarter wave plate.

Turning next to FIG. 1B, the time-multiplexer 28 is set to an "OFF" state, which deactivates the quarter wave plate 18 and thus light entering the system 10 with initial polarization P0 traveling along the light path 12 will not be rotated to polarization P1 as it passes through the quarter wave plate 18. Therefore, the light will not obtain the correct polarization to reflect from the circular polarizing reflector 20 and will instead be transmitted directly though the circular polarizing reflector 20. If any light traveling along light path 12 enters the user's eye 26, the user will see it as emanating directly from image source 14. In certain embodiments of this system, the light path 12 is configured to prevent such light from being seen by the viewer. In other embodiments, the system may be configured to transmit an unmagnified image of the image source 14 to the user's eye 26.

Figure 1C:
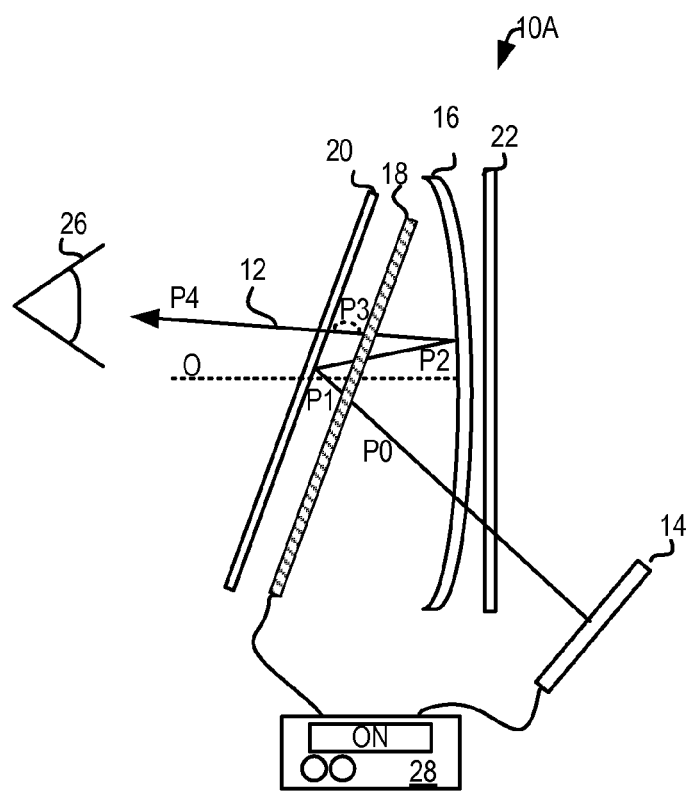
FIG. 1C shows the system of FIG. 1A further configured to control the transmission of light to the user's eye by activating and deactivating a quarter wave plate at a set frequency.

Turning next to FIG. 1C, the time-multiplexer 28 may be configured to activate and deactivate the quarter wave plate 18 at a set frequency. Time-multiplexer 28 may be further configured activate and deactivate the image source 14 at a complimentary frequency such that the image source 14 only transmits light to the system 10 when the quarter wave plate 18 is activated. The system 10 may then be configured to use the time-multiplexer as a filter preventing unwanted glare, an unmagnified image from the image source 14 or other noise from being transmitted through the system 10 to the user's eye 26.

FIG. 1C depicts an embodiment of the system 10A, in which the image source 14, the quarter wave plate 18, and the circular polarizing reflector 20 tilted to an off-axis angle with respect to the optical axis O in order to illustrate how the time-multiplexer 28 can be used to change the ratio of image light to ambient light from the outside world. As described above, the image source 14 only transmits light to the system 10 when the quarter wave plate 18 is activated. Conversely, when the quarter wave plate 18 is not activated, ambient light passes through initial polarizer 22 and is then transmitted through curved polarizer 16, quarter wave plate 18, and reflective polarizer 20 with only nominal attenuation. Thus, by varying the duty cycle of time-multiplexer 28, the amount of ambient light can be adjusted from 0% to over 90% for one polarization of ambient light, effectively acting as a global dimming component for the outside world as seen by the user's eye 26. In some embodiments, the image source 14 is also modulated in intensity, so that the display intensity can be dimmed independently of the ambient image light.

Turning briefly back to FIG. 1A, the system 10 further includes an initial polarizer 22 positioned upstream of the circular polarizing reflector 20 on the light path, the initial polarizer 22 configured to receive light from the image source 14 and transmit light with an initial polarization P0 along the light path toward the curved linear polarizing reflector 16. The curved linear polarizing reflector 16 may be further configured to receive the light with the initial polarization P0 from the initial polarizer 22 and transmit the light along the light path toward the quarter wave plate 18. The quarter wave plate 18 may be further configured to rotate the polarization of the light received from the curved linear polarizing reflector 16 from the initial polarization P0 to the first polarization P1 and transmit the light along the light path toward the circular polarizing reflector 20. In some embodiments, the image source 14, the initial polarizer 22, the curved linear polarizing reflector 16, the quarter wave plate 18, and the circular polarizing reflector 20 may be configured in a flat coaxial orientation. Thus, the system 10 may be configured such that light transmitted from the image source 14 travels along a substantially straight path through the initial polarizer 22, the curved linear polarizing reflector 16 and the quarter wave plate 18. After passing through the quarter wave plate 18, the system 10 may be configured such that the polarization of the light is rotated from the initial polarization P0 to the first polarization P1. When the light of polarization P1 is incident on the circular polarizing reflector 20, it will reflect back through the system 10 in the manner described above. In certain embodiments, the image source 14 may be a transmissive or transparent display device, allowing ambient light to enter the system through the initial polarizer as well. In other embodiments, the image source 14 may be configured as a transmissive display device overlaying a second display device. In such embodiments, the system may be configured to transmit light from both display devices to the user's eye 26. In some examples, the differing distances between the display devices and the curved polarizer 16 result in different display planes being visible to the user at different depths.

Figure 2:
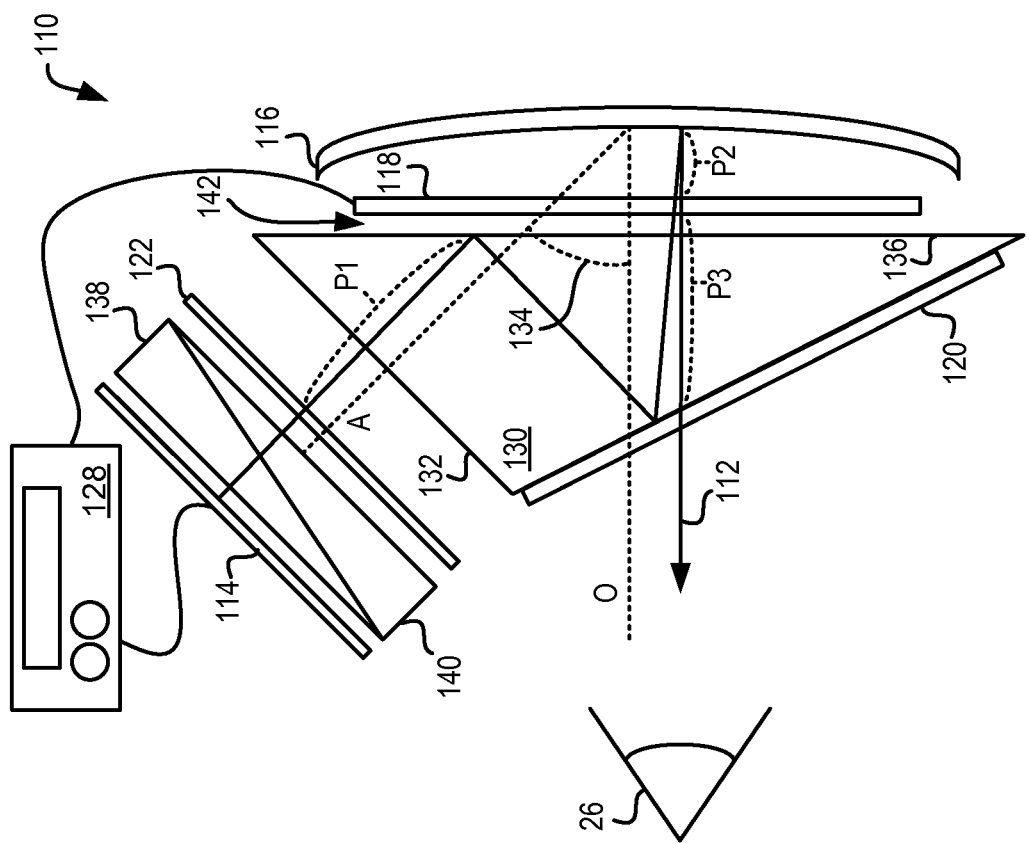
FIG. 2 shows the system of FIG. 1A further configured to include a prism positioned in the light path between the image source and the user's eye, the prism configured to reflect light from the image source via total internal reflection or other means.

Turning next to FIG. 2, a system 110 is depicted in which a fixed wave plate 122 is positioned upstream of the circular polarizing reflector 120 on the light path, the fixed wave plate 122 configured to receive the light from the image source 114 and transmit the light with the first polarization P1 along the light path in a direction of a prism 130 disposed between the fixed wave plate 122 and the circular polarizing reflector 120. The prism 130 is configured to receive the light through a light input side 132 of the prism 130 and reflect the light off an internal surface 136 of the prism 130 via total internal reflection along the light path toward the circular polarizing reflector 120. In FIG. 2, a second prism 138 and a second matching prism 140 may be positioned between image source 114 and the fixed wave plate 122. The second prism 138 may reflect light from a light source toward the image source 114, while the second matching prism 140 may help to prevent light reflected by the image source 114 from being refracted or reflected away from the desired optical path 112. In certain embodiments where image source 114 is an emissive display device the second prism 138 and second matching prism 140 may be omitted. It should also be noted that an air gap 142 may be created between the prism 130 and the quarter wave plate 118 so as to allow the light entering the system to reflect off the internal surface 136 via total internal reflection. In some embodiments, other means are used to reflect the light from surface 136, including but not limited to multilayer coatings.

The system 110 may be further configured such that an image source 114 is positioned at an angle 134 less than ninety degrees with respect to an optical axis O of the curved linear polarizing reflector 116 so as to project side-addressed light toward the curved linear polarizing reflector 116. The prism 130 may be positioned such that angle 134 between the optical axis O of the curved linear polarizing reflector 116 and the axis A of the image source 114 is less than 90 degrees. As a result, the overall size of the system 110 can be decreased. The system 110 may be further configured to receive ambient light through the curved linear polarizing reflector 116. In certain embodiments, a time-multiplexer 128 may be configured to control the image source 114 and quarter wave plate 118 in the manner described previously and, in doing so, dynamically control the brightness of the contrast between the ambient light and the light from the image source 114.

Turning briefly back to FIG. 1A, the curved linear polarizing reflector 16 may be a curved wire grid polarizing (WGP) beamsplitter. A curved WGP beamsplitter may be manufactured so as to reflect one polarization of light and transmit another with over 90 percent efficiency. In some embodiments, the curved linear polarizing reflector 16 may be a curved WGP polarizing beamsplitter that is configured to reflect one of S-polarized or P-polarized light, and to transmit the other. In such embodiments, the system 10 may be configured to lose less than 10 percent of the total light intensity when the light reflects off of curved linear polarizing reflector 16. In addition, the circular polarizing reflector 20 may be configured to be a cholesteric liquid crystal (CLC) reflective polarizer. A CLC reflective polarizer may also be manufactured to have a very high efficiency of reflection and transmission of polarized light. Thus, in some embodiments, the system 10 may be configured to use a CLC reflective polarizer as circular polarizing reflector 20 so as to prevent a loss of light intensity as light travels along light path 12 and bounces off of circular polarizing reflector 20. In other embodiments, different materials may be used for the curved linear polarizing reflector 16 and the circular polarizing reflector 20. For example, various nanostructure devices exist or are currently under development that may offer reflection and transmission efficiencies greater than or equal to those of the curved WGP beamsplitter and CLC reflective polarizer discussed above.

In FIG. 1A, the circular polarizing reflector 20 may be configured to have a flat shape. In other embodiments, the circular polarizing reflector 20 may be configured to have a curved shape. Likewise, FIG. 1A depicts the curved linear polarizing reflector 16 as having a curved shape. However, it should also be noted that in certain embodiments, in which the circular polarizing reflector 20 has a curved shape, the curved linear polarizing reflector 16 may also be configured to have a flat shape.

Figure 3A:
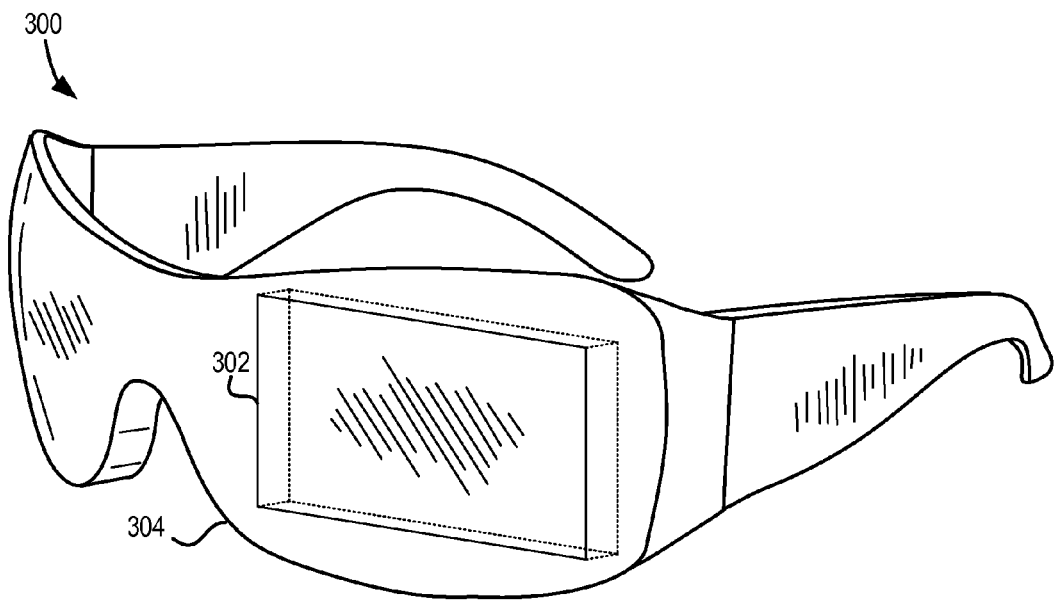
FIG. 3A shows an embodiment of the system of FIG. 1A mounted in a near-eye display system and incorporated into the housing of a head-mounted display device.

Turning next to FIG. 3A, the system 10 may be configured as a near-eye display device 302. The image source 14, curved linear polarizing reflector 16, quarter wave plate 18, and circular polarizing reflector 20 of FIG. 1A may be configured to be mounted in the near-eye display device 302. FIG. 3A further depicts the near eye display device 302 as incorporated into a housing 304 of a head mounted display device 300. The head mounted display device 300 may be configured as a pair of glasses to be worn on the head of the user. The near-eye display device 302 may be incorporated into a portion of the housing 304 that would be positioned in front of and close to a user's eye. In other embodiments, the near-eye display device 302 may be incorporated into a hand-held or wrist-worn device that is designed to be held near a user's eye while in use. Such embodiments may take the form of a watch or a screen on a hand-held device. In other embodiments, the display device 300 may be configured as a stereoscopic head mounted display device employing two near eye display devices 302, with one near eye display devices 302 positioned in front of and close to each of the user's eyes.

Figure 3B:
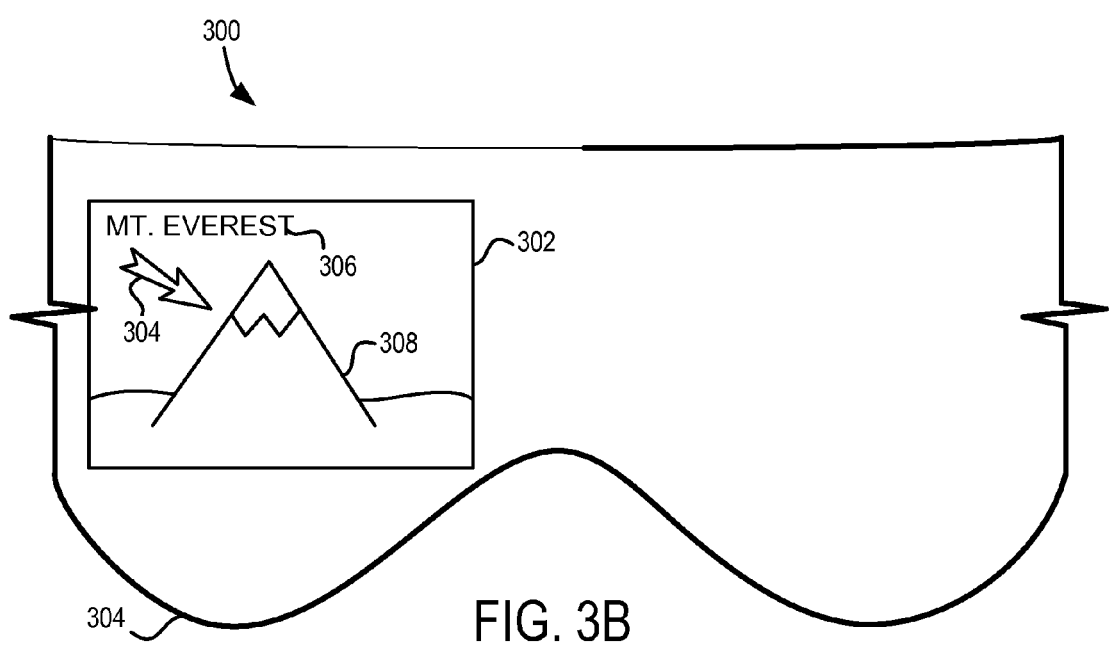
FIG. 3B shows a view of the head-mounted display device of FIG. 3A from a user's perspective.

FIG. 3B shows the head-mounted display device 300 from a user's perspective, looking through the near-eye display device 302 incorporated into the housing 304. The near-eye display device may be configured to display mixed reality consisting of a real world object 308, computer generated graphics 304 and computer generated text 306. The near-eye display system may be further configured such that the computer generated graphics 304 and computer generated text 306 display information relating to the real world object 308 so as to enhance the viewing experience of the user. For example, FIG. 3B depicts real world object 308 as Mt. Everest, computer generated graphics 304 as an indicator arrow pointing to real world object 308, and computer generated text 306 as name information for the real world object 308.

Figure 4:
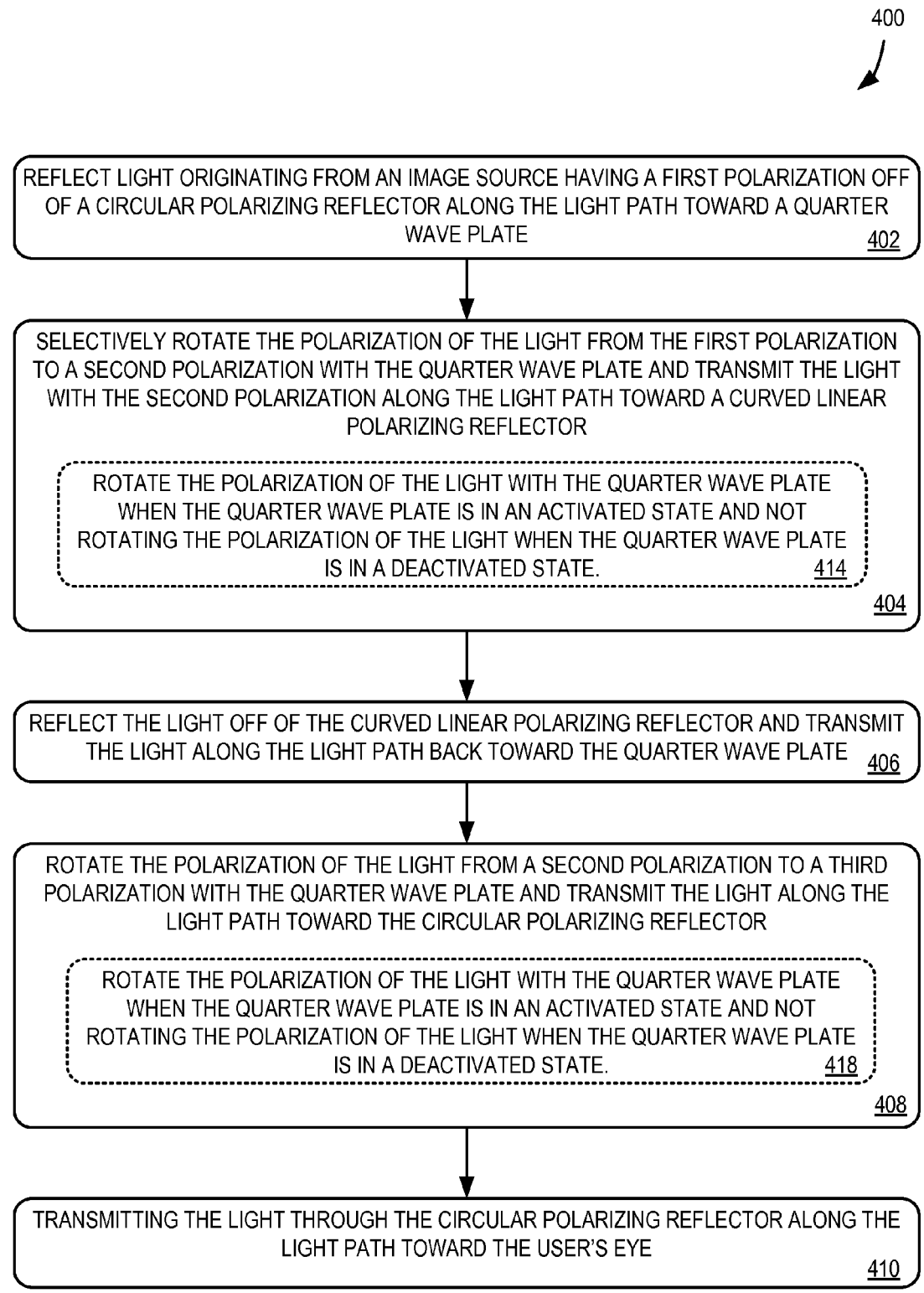
FIG. 4 shows a flowchart depicting a method of transmitting light along a light path to a user's eye in accordance with an embodiment of this disclosure.

Turning next to FIG. 4, a flowchart is depicted showing a method 400 of transmitting light along a light path to a user's eye. The method 400 includes, at step 402, reflecting light originating from an image source having a first polarization off of a circular polarizing reflector along the light path toward a quarter wave plate. At 404, the method 400 further includes rotating the polarization of the light from the first polarization to a second polarization with the quarter wave plate and transmitting the light with the second polarization along the light path toward a curved linear polarizing reflector. At 406, the method 400 includes reflecting the light off of the curved linear polarizing reflector and transmitting the light along the light path back toward the quarter wave plate. At 408, the method 400 includes rotating the polarization of the light from a second polarization to a third polarization with the quarter wave plate and transmitting the light along the light path toward the circular polarizing reflector. At 410, the method 400 further includes transmitting the light through the circular polarizing reflector along the light path toward the user's eye. In addition, the method may further include optional steps 414 and 418 at steps 404 and 408, respectively. Steps 414 and 418 include rotating the polarization of the light with the quarter wave plate when the quarter wave plate is in an activated state and not rotating the polarization of the light when the quarter wave plate is in a deactivated state. Typically, this is accomplished in the manner described above by the switchable quarter wave plate being switched ON and OFF according to the signal of a time multiplexer in the examples of FIGS. 1A-1C.

Figure 5A:
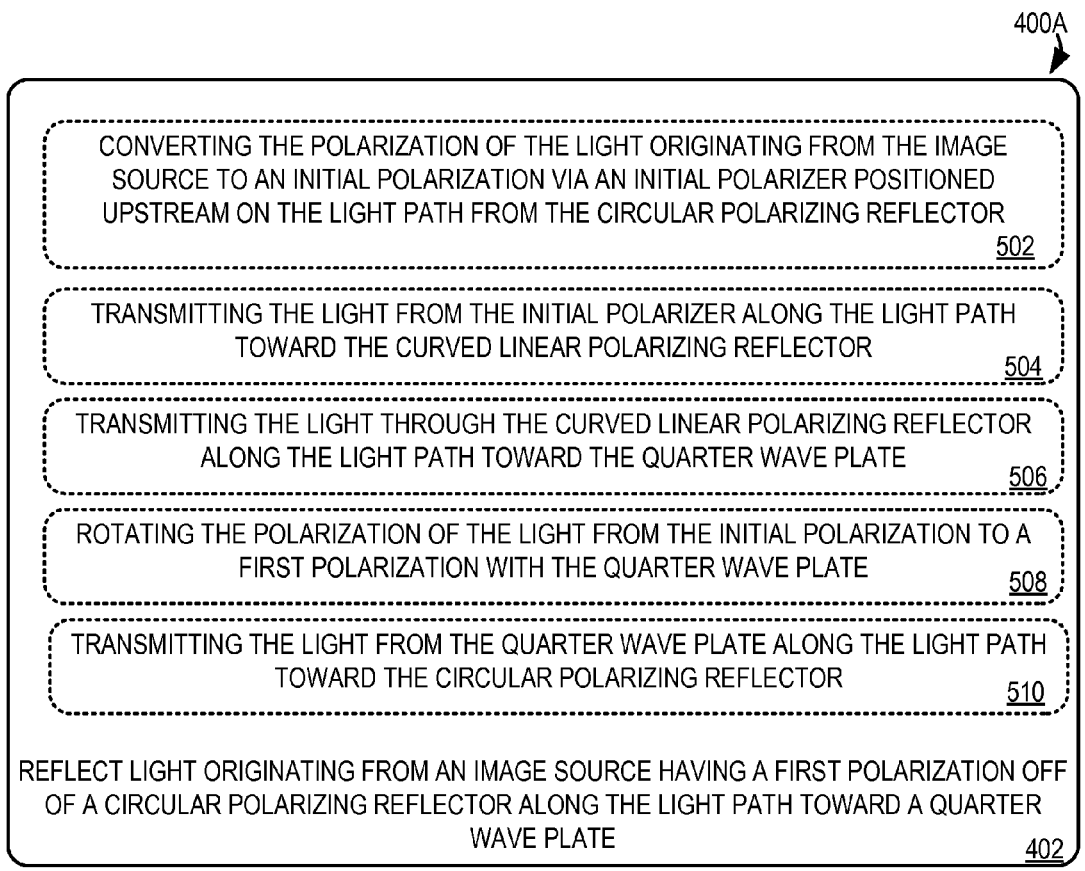
FIG. 5A shows a step of the flowchart of FIG. 4 expanded to include steps relating to an embodiment of the present disclosure.
Figure 5B:
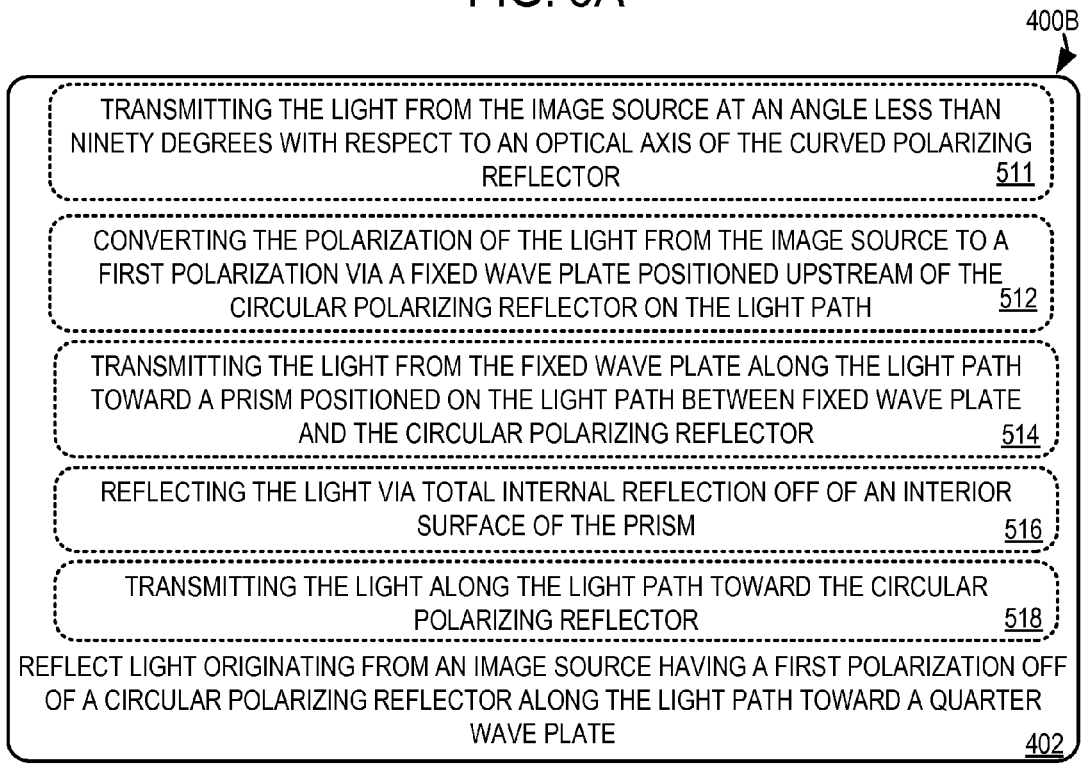
FIG. 5B shows a step of the flowchart of FIG. 4 expanded to include steps relating to an embodiment of the present disclosure.

FIG. 5A and FIG. 5B depict two embodiments of the method 400, respectively labeled as 400A, 400B, which respectively include various substeps of step 402 in the method 400. As illustrated in FIG. 5A, method 400A may include, at 502, converting the polarization of the light originating from the image source to an initial polarization via an initial polarizer positioned upstream on the light path from the circular polarizing reflector. At 504, the method 400A includes transmitting the light from the initial polarizer along the light path toward the curved linear polarizing reflector. At 506, the method 400A includes transmitting the light through the curved linear polarizing reflector along the light path toward the quarter wave plate. At 508, the method 400A includes rotating the polarization of the light from the initial polarization to a first polarization with the quarter wave plate. At 510, the method 400A includes transmitting the light from the quarter wave plate along the light path toward the circular polarizing reflector. Following step 510, the method proceeds to step 404 of method 400 illustrated in FIG. 4.

Turning next to FIG. 5B, the method 400B includes, at step 512, converting the polarization of the light from the image source to a first polarization via a fixed wave plate positioned upstream of the circular polarizing reflector on the light path. At step 514, the method 400B includes transmitting the light from the fixed wave plate along the light path toward a prism positioned on the light path between fixed wave plate and the circular polarizing reflector. At step 516, the method 400B includes reflecting the light via total internal reflection off of an interior surface of the prism. At step 518, the method 400B includes transmitting the light along the light path toward the circular polarizing reflector. FIG. 5B depicts an additional optional step at 511, in which the method 400B includes transmitting the light from the image source at an angle less than ninety degrees with respect to an optical axis of the curved polarizing reflector. Following step 518, the method proceeds to step 404 of method 400 illustrated in FIG. 4.

It should be further noted that in certain embodiments of the method 400, the curved linear polarizing reflector may be a curved wire grid polarizing beamsplitter. Furthermore, the circular polarizing reflector may be a cholesteric liquid crystal reflective polarizer. In addition, the circular polarizing reflector may have one of a flat or curved shape.

In some embodiments, the methods and processes described herein may be tied to a computing system of one or more computing devices. In particular, such methods and processes may be implemented as a computer-application program or service, an application-programming interface (API), a library, and/or other computer-program product, e.g. to display an image via the disclosed display system embodiments.

Figure 6:
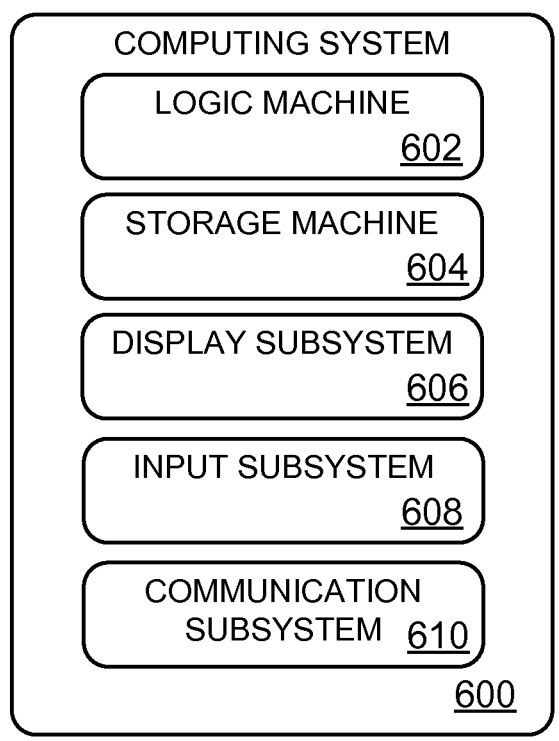
FIG. 6 shows a simplified schematic illustration of an embodiment of a computing device in accordance with an embodiment of this disclosure.

FIG. 6 schematically shows a non-limiting embodiment of a computing system 600 that can enact one or more of the methods and processes described above. Computing system 600 is shown in simplified form. Computing system 600 may take the form of a head-mounted see-through display device, as well as any other suitable computing system, including but not limited to game consoles, one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may also include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/

ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optical display system configured to transmit light along a light path to a user's eye, the display system comprising:
   a circular polarizing reflector configured to reflect light with a first polarization originating from an image source;
   a quarter wave plate positioned downstream of the circular polarizing reflector in the light path, the quarter wave plate configured to rotate the polarization of the light from the first polarization to a second polarization; and
   a curved linear polarizing reflector positioned downstream of the quarter wave plate, the curved linear polarizing reflector configured to reflect the light with the second polarization back through the quarter wave plate along the light path in the direction of the circular polarizing reflector;
   wherein the quarter wave plate is further configured to rotate the polarization of the light received from the curved linear polarizing reflector from the second polarization to a third polarization; and
   wherein the circular polarizing reflector is further configured to receive the light having the third polarization from the quarter wave plate and to transmit the light with the third polarization toward the user's eye.

2. The display system of claim 1, wherein the quarter wave plate is a switchable quarter wave plate configured to rotate the polarization of the light if the switchable quarter wave plate is activated and to not rotate the polarization of the light if the quarter wave plate is deactivated.

3. The display system of claim 1, further comprising:
   an initial polarizer positioned upstream of the circular polarizing reflector on the light path, the initial polarizer configured to receive light from the image source and transmit light with an initial polarization along the light path toward the curved linear polarizing reflector;
   wherein the curved linear polarizing reflector is further configured to receive the light with the initial polarization from the initial polarizer and transmit the light along the light path toward the quarter wave plate; and
   wherein the quarter wave plate is further configured to rotate the polarization of the light received from the curved linear polarizing reflector from the initial polarization to the first polarization and transmit the light along the light path toward the circular polarizing reflector.

4. The display system of claim 1, further comprising:
   a fixed wave plate positioned upstream of the circular polarizing reflector on the light path, the fixed wave plate configured to receive the light from the image source and transmit light with the first polarization along the light path in a direction of a prism disposed between the fixed wave plate and the circular polarizing reflector;
   wherein the prism is configured to receive the light through a light input side of the prism and reflect the light off an internal surface of the prism via total internal reflection along the light path toward the circular polarizing reflector.

5. The display system of claim 4, wherein the image source is positioned at an angle less than ninety degrees with respect to an optical axis of the curved linear polarizing reflector so as to project side-addressed light toward the curved linear polarizing reflector.

6. The display system of claim 1, wherein the curved linear polarizing reflector is a curved wire grid polarizing beamsplitter.

7. The display system of claim 1, wherein the circular polarizing reflector is a cholesteric liquid crystal reflective polarizer.

8. The display system of claim 1, wherein the circular polarizing reflector is configured to have a flat shape.

9. The display system of claim 1, wherein the circular polarizing reflector is configured to have a curved shape.

10. The display system of claim 1, wherein the image source, curved linear polarizing reflector, quarter wave plate, and circular polarizing reflector of the display system are mounted in a near-eye display device.

11. The display system of claim 10, wherein the near eye display device is incorporated into a housing of a head mounted display device.

12. A method of transmitting light along a light path to a user's eye, comprising:
reflecting light originating from an image source having a first polarization off of a circular polarizing reflector along the light path toward a quarter wave plate;
rotating the polarization of the light from the first polarization to a second polarization with the quarter wave plate and transmitting the light with the second polarization along the light path toward a curved linear polarizing reflector;
reflecting the light off of the curved linear polarizing reflector and transmitting the light along the light path back toward the quarter wave plate;
rotating the polarization of the light from a second polarization to a third polarization with the quarter wave plate and transmitting the light along the light path toward the circular polarizing reflector; and
transmitting the light through the circular polarizing reflector along the light path toward the user's eye.

13. The method of claim 12, further comprising:
rotating the polarization of the light with the quarter wave plate when the quarter wave plate is in an activated state and not rotating the polarization of the light when the quarter wave plate is in a deactivated state.

14. The method of claim 12, further comprising:
converting the polarization of the light originating from the image source to an initial polarization via an initial polarizer positioned upstream on the light path from the circular polarizing reflector;
transmitting the light from the initial polarizer along the light path toward the curved linear polarizing reflector
transmitting the light through the curved linear polarizing reflector along the light path toward the quarter wave plate;
rotating the polarization of the light from the initial polarization to a first polarization with the quarter wave plate; and
transmitting the light from the quarter wave plate along the light path toward the circular polarizing reflector.

15. The method of claim 12, further comprising:
converting the polarization of the light from the image source to a first polarization via a fixed wave plate positioned upstream of the circular polarizing reflector on the light path;
transmitting the light from the fixed wave plate along the light path toward a prism positioned on the light path between fixed wave plate and the circular polarizing reflector;
reflecting the light via total internal reflection off of an interior surface of the prism; and
transmitting the light along the light path toward the circular polarizing reflector.

16. The method of claim 15, further comprising:
transmitting the light from the image source at an angle less than ninety degrees with respect to an optical axis of the curved polarizing reflector.

17. The method of claim 12, wherein the curved linear polarizing reflector is a curved wire grid polarizing beamsplitter.

18. The method of claim 12, wherein the circular polarizing reflector is a cholesteric liquid crystal reflective polarizer.

19. The display system of claim 12, wherein the circular polarizing reflector is one of a flat or curved shape.

20. A method of transmitting light along a light path to a user's eye, comprising:
converting the polarization of light from an image source to a first polarization via a fixed wave plate positioned upstream of a circular polarizing reflector on the light path;
transmitting the light from the fixed wave plate along the light path toward a prism positioned on the light path between fixed wave plate and the circular polarizing reflector;
reflecting the light via total internal reflection off of an interior surface of the prism;
transmitting the light along the light path toward the circular polarizing reflector;
reflecting the light originating from the image source having the first polarization off of a circular polarizing reflector along the light path toward a quarter wave plate;
rotating the polarization of the light from the first polarization to a second polarization with the quarter wave plate and transmitting the light with the second polarization along the light path toward a curved linear polarizing reflector;
reflecting the light off of the curved linear polarizing reflector and transmitting the light along the light path back toward the quarter wave plate;
rotating the polarization of the light from a second polarization to a third polarization with the quarter wave plate and transmitting the light along the light path toward the circular polarizing reflector; and
transmitting the light through the circular polarizing reflector along the light path toward the user's eye.

* * * * *